US008808892B2

(12) United States Patent
Maxwell et al.

(10) Patent No.: US 8,808,892 B2
(45) Date of Patent: Aug. 19, 2014

(54) TEMPORARY INSULATOR FOR BATTERY PACKS AND ASSOCIATED SYSTEMS AND METHODS

(75) Inventors: Thomas P. Maxwell, Beaverton, OR (US); Eric Petterson, Beavewrton, OR (US)

(73) Assignee: Greatbatch Ltd., Clarence, NY (US)

( * ) Notice: Subject to any disclaimer, the term of this patent is extended or adjusted under 35 U.S.C. 154(b) by 465 days.

(21) Appl. No.: 12/903,878

(22) Filed: Oct. 13, 2010

(65) Prior Publication Data

US 2011/0086255 A1    Apr. 14, 2011

Related U.S. Application Data

(60) Provisional application No. 61/251,696, filed on Oct. 14, 2009.

(51) Int. Cl.
*H01M 2/10* (2006.01)
*B23P 11/00* (2006.01)
*H01M 2/20* (2006.01)
*H01M 2/22* (2006.01)
*H01M 2/32* (2006.01)
*B23P 11/02* (2006.01)

(52) U.S. Cl.
CPC    *H01M 2/20* (2013.01); *H01M 2/22* (2013.01); *H01M 2/32* (2013.01); *H01M 2/202* (2013.01); *H01M 2/204* (2013.01); *H01M 2/10* (2013.01); *H01M 2/1094* (2013.01); *B23P 11/00* (2013.01); *B23P 11/025* (2013.01)
USPC ................. 429/99; 429/96; 29/878; 29/593; 29/428

(58) Field of Classification Search
CPC ........ B23P 11/00; B23P 11/025; H01M 2/10; H01M 2/1094; H01M 2/20; H01M 2/22; H01M 2/32; H01M 2/202; H01M 2/204
USPC ............................................ 29/428, 593, 878
See application file for complete search history.

(56) References Cited

U.S. PATENT DOCUMENTS

| 5,977,746 A | 11/1999 | Hershberger et al. |
| 5,985,480 A * | 11/1999 | Sato et al. .................. 429/65 |

(Continued)

FOREIGN PATENT DOCUMENTS

| EP | 2104121 | | 9/2009 | |
| JP | 03-138857 | * | 6/1991 | .............. H01M 2/30 |

(Continued)

OTHER PUBLICATIONS

Translation of Abstract of JP 03-138857 to Mutsuo.*
EP Search dated Apr. 14, 2014, Application No. 10824023.5.

*Primary Examiner* — Milton I Cano
*Assistant Examiner* — Michael Dignan
(74) *Attorney, Agent, or Firm* — Michael F. Scalise (57) ABSTRACT

Battery packs having electrically insulating material between conductive surfaces of electrical components are described herein. In some embodiments, a battery pack includes a battery cell with a first conductive surface, an electrically conductive member with a second conductive surface, and electrically insulating material positioned between the first and second conductive surfaces. The electrically insulating material has at least one passage that enables the first and second conductive surfaces to be electrically connected. For example, the passage in the electrically insulating material may be formed by, during, or as a result of a process in which the first and second conductive surfaces are attached, such as by a welding process that both ablates a portion of the electrically insulating material to form the through passage and that physically joins the first and second conductive surfaces, thereby creating an electrical connection therebetween.

20 Claims, 5 Drawing Sheets

(56) References Cited

U.S. PATENT DOCUMENTS

| | | |
|---|---|---|
| 7,479,346 B1 * | 1/2009 | Chow et al. .................... 429/158 |
| 2005/0250006 A1 * | 11/2005 | Kim ............................ 429/160 |
| 2007/0152235 A1 * | 7/2007 | Hosoya ......................... 257/111 |
| 2008/0261107 A1 * | 10/2008 | Snyder et al. ................. 429/144 |
| 2009/0061301 A1 | 3/2009 | Planck |

FOREIGN PATENT DOCUMENTS

| | | |
|---|---|---|
| JP | 03138857 A | 6/1991 |
| JP | 896793 | 4/1996 |
| JP | 2005235696 A | 9/2005 |
| JP | 2009037785 A | 2/2009 |

* cited by examiner

TEMPORARY INSULATOR FOR BATTERY PACKS AND ASSOCIATED SYSTEMS AND METHODS

CROSS-REFERENCE TO RELATED APPLICATION

The present application claims priority to pending U.S. Provisional Application 61/251,696, filed on Oct. 14, 2009 and incorporated herein by reference. To the extent that the foregoing patent application and/or any other documents incorporated into the present application conflict with the disclosure in the present application, the disclosure in the present application controls.

TECHNICAL FIELD

The present disclosure is related to packaged battery devices and methods of manufacturing such devices.

BACKGROUND

Many portable electronic devices employ a battery package in lieu of conventional batteries or conventional battery arrangements. Existing battery packages are rechargeable and customizable, and typically include an array of rechargeable battery cells, circuitry for monitoring and regulating output power, and a casing that houses the battery cells and battery circuitry. Accordingly, battery packages can be tailored so that the battery cells meet specific power requirements, the package circuitry provides power feedback and control, and the package casing protects the package cells and circuitry from various environmental factors. For example, battery cells for portable medical equipment (e.g., defibrillators, portable X-ray devices, and insulin pumps) are designed to meet stringent power tolerances. The package circuitries for hand-held data collection devices (e.g., barcode scanners, RFID readers, and portable printers) are configured to accommodate usage patterns, and the package casings for field instruments have contact openings that are fitted with Gortex® seals to prevent moisture from entering the battery package.

Despite the foregoing advantages, battery packages are more complex than conventional batteries and can therefore be more prone to failure or diminishing performance. For example, if an individual battery cell fails, this event can cause other battery cells within the package to rapidly discharge, resulting in overheating. If the package circuitry fails, the battery package may stop functioning correctly. If the package casing becomes compromised, moisture or other types of environmental influences may affect battery package performance. Thus, to facilitate battery package operation, battery package designers need to address issues that are not common to conventional batteries and battery arrangements.

DETAILED DESCRIPTION

The present disclosure describes various types of battery packs and associated systems and methods. In some embodiments, for example, a battery pack includes an electrical insulator having an ablated passage which enables an electrically conductive member to be electrically connected to a battery cell. Certain details are set forth in the following description and in FIGS. 1-4 to provide a thorough understanding of various embodiments of the disclosure. Other details describing well-known aspects of battery packs and associated systems and methods for manufacturing and/or using such packs, however, are not set forth in the following disclosure so as to avoid unnecessarily obscuring the description of the various embodiments.

Many of the details, dimensions, angles and other features shown in the Figures are merely illustrative of particular embodiments. Accordingly, other embodiments can have other details, dimensions, angles and features. In addition, further embodiments can be practiced without several of the details described below.

In the Figures, identical reference numbers identify identical, or at least generally similar, elements. To facilitate the discussion of any particular element, the most significant digit or digits of any reference number generally refer to the Figure in which that element is first introduced. For example, element 100 is first introduced and discussed with reference to FIG. 1.

Figure 1:
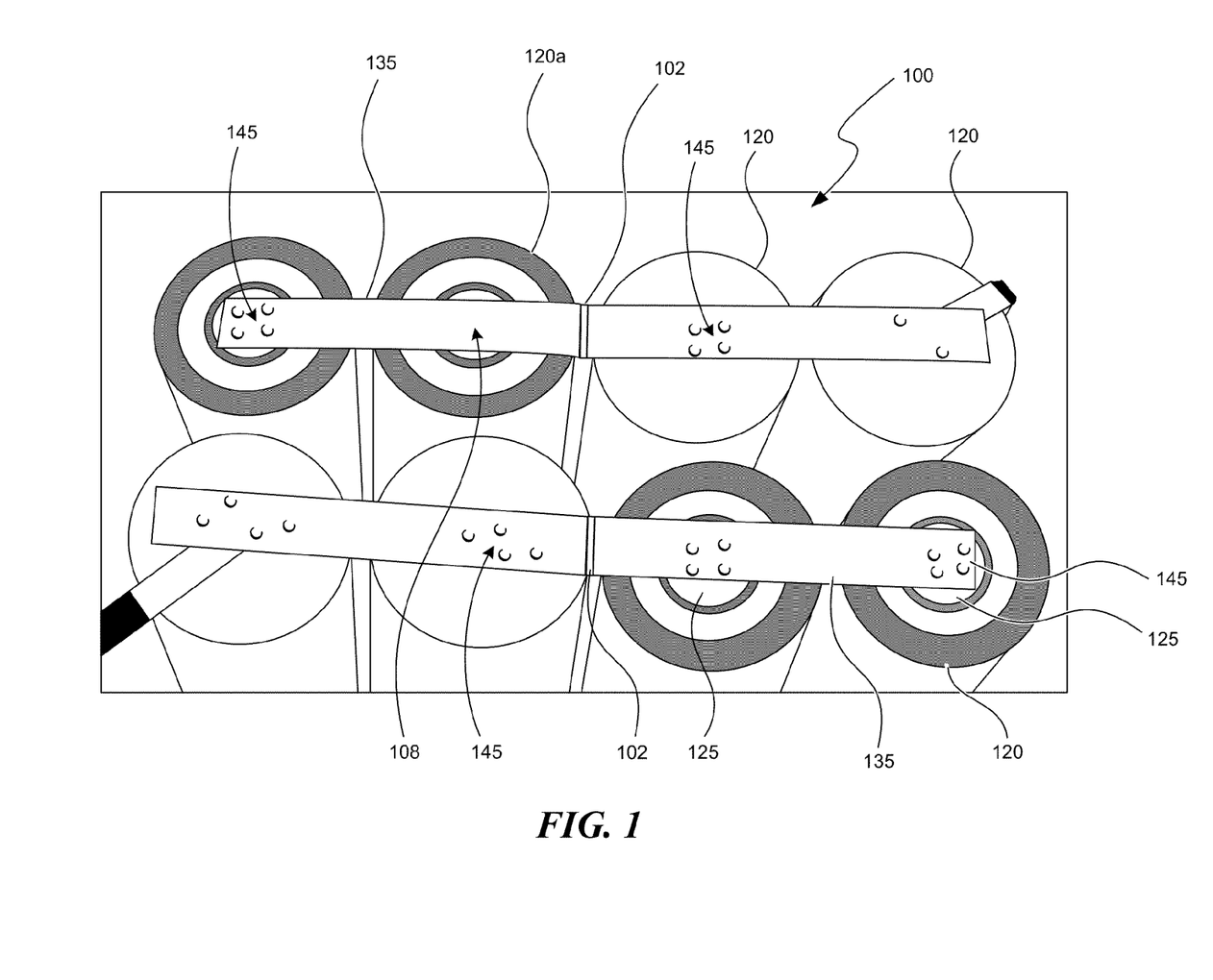
FIG. 1 is a top view of an arrangement of multiple battery cells and electrical connectors.

FIG. 1 is a top view of an arrangement 100 of multiple battery cells 120. Individual cells 120 have an electrically conductive surface 125 (e.g., a battery terminal) for electrical communication with other cells and/or other elements. Each of the cells 120 shown in FIG. 1, with the exception of a target cell 120*a*, is fixedly attached to an electrical connector 135 by one or more welds 145 that electrically connect the electrically conductive surface 125 to a corresponding electrical connector 135. The target cell 120*a* is not fixedly electrically attached to a corresponding electrical connector 135, as evidenced by the absence of any welds in a connection region 108. The target cell 120*a* may (inadvertently) not have been welded to the corresponding electrical connector 135 during assembly, and subsequent quality control testing of the arrangement 100 may not have revealed that the cell 120*a* and the corresponding electrical connector 135 are not fixedly attached. For example, the arrangement 100 configured as illustrated in FIG. 1 may have passed the quality control test because, although not welded, the corresponding electrical connector 135 and the target cell 120*a* may have been in contact with each other or sufficiently proximate so as to form an at least temporary electrical connection that was sufficient to pass the quality control test. However, the arrangement 100 (and the connection between the electrical connector 135*a* and the target cell 120*a*) may be manipulated, re-shaped or otherwise changed after testing and before use by an end user, for example, by folding the arrangement in half using hinges 102 or another suitable bending connection carried by the electrical corresponding electrical connector 135. As a result, the corresponding electrical connector 135 may shift far enough away from the target cell 120a so as to disrupt or prevent the electrical connection between these components. Accordingly, the potential exists for the arrangement 100 to be provided to an end user in a faulty configuration. Aspects of the present technology, described in further detail below, are directed to preventing or at least reducing the number of instances in which any of the cells 120 are not properly electrically connected to a corresponding connector 135.

Figure 2:
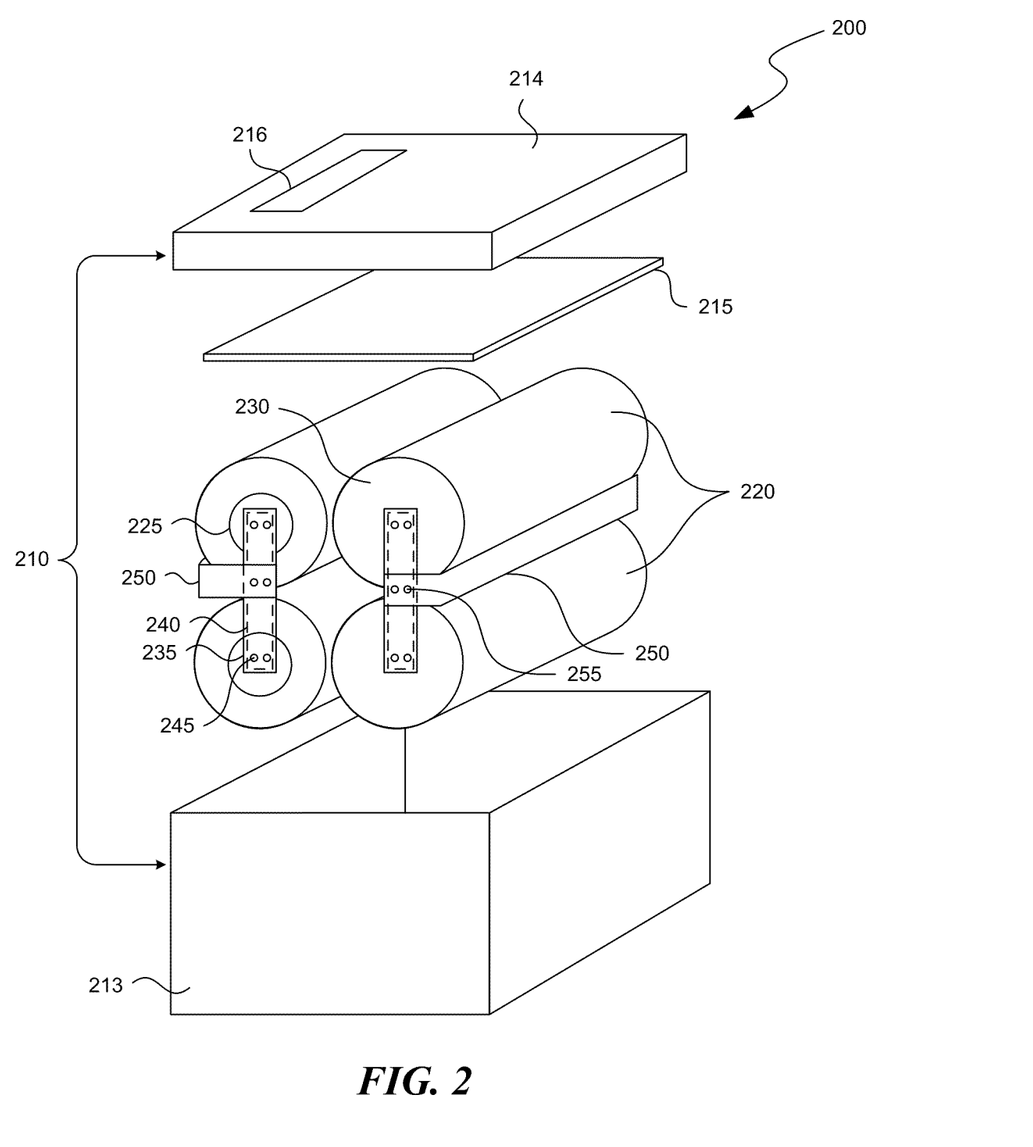
FIG. 2 is an exploded, isometric view of a battery package configured in accordance with an embodiment of the disclosure.
Figure 3A:
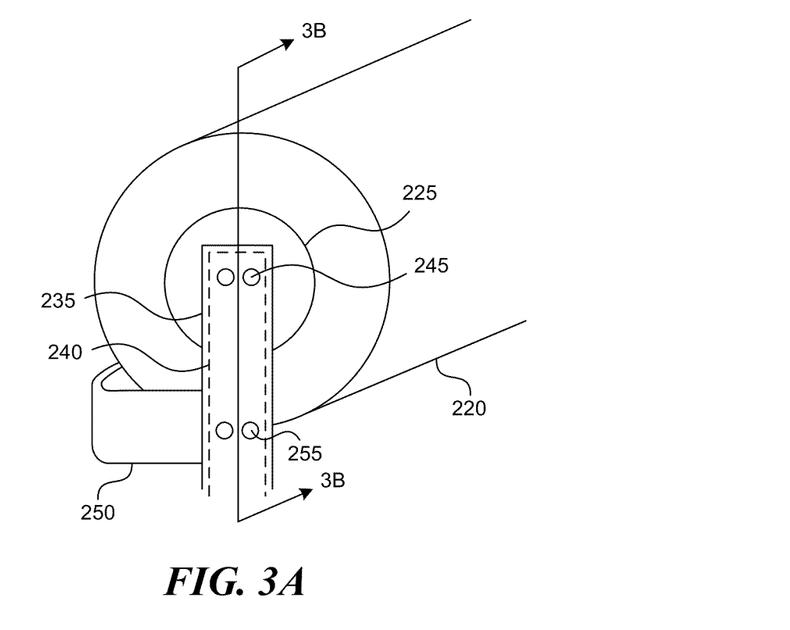
FIG. 3A is an enlarged isometric view of a portion of the battery package illustrated in FIG. 2.

FIG. 2 is an exploded, isometric view of a battery pack or package 200 configured in accordance with an embodiment of the disclosure, and FIG. 3A is an enlarged isometric view of a portion of the battery package 200 illustrated in FIG. 2. The battery package 200 can include a package casing, housing or shell 210 having a casing body 213 and a casing lid 214. The package casing 210 houses multiple battery cells 220 and an electrical or electronic component 215 (for example, a printed circuit board containing circuit devices and/or elements). The casing lid 214 can include a display 216 (for example, an LED display) that displays information provided by the electrical component 215. The battery package 200 can be electrically coupled to an electronic device to provide power to the electronic device. The battery cells 220 may be physically supported using devices and methods described in co-pending U.S. patent application Ser. No. 12/201,636 (entitled SPACERS FOR FIXING BATTERY CELLS WITHIN A BATTERY PACKAGE CASING AND ASSOCIATED SYSTEMS AND METHODS, which is incorporated by reference herein.

Each battery cell 220 includes an electrically conductive surface (for example, a conductive surface of a positive terminal 225 and a negative terminal 230). As described in more detail with reference to, for example, FIGS. 3A and 3B, the conductive surfaces of the battery cells 220 are electrically connected to an electrically conductive surface of a first electrically conductive member 235, such as by welds 245. The two conductive surfaces are attached through one or more first passages in an electrical insulator 240 (an underlying portion of which is shown in dashed lines) that covers at least a portion of the conductive surface of the first electrically conductive member 235. The insulator 240 can accordingly prevent accidental electrical contact between the cells 220 and the conductive members 235 until the welds 245 or other connections are formed. The conductive surface of the first electrically conductive member 235 can also be electrically connected to a conductive surface of a second electrically conductive member 250, such as by welds 255. The conductive surface of the first electrically conductive member 235 and the conductive surface of the second electrically conductive member 250 are attached through one or more second passages in an overlying portion of the electrical insulator 240 which is not shown in FIGS. 2 and 3A, but is described further below with reference to FIG. 3B.

The battery cells 220 can generate power based on a suitable internal chemistry, for example, an alkaline, lithium, nickel cadmium, nickel metal-hydride, and/or lithium ion chemistry. The electrically conductive members 235, 250 can include various types of electrically conductive material, such as nickel, copper, silver, and/or other types of metallic or non-metallic electrically conductive materials. In particular embodiments, the electrically conductive members are in the form of thin strips.

The electrical insulator 240 can include any of a variety of suitable non-electrically conductive materials, such as polymeric materials (for example, polyethylene, polypropylene, polyvinyl chloride, polyethylene terephthalate, polystyrene and polycarbonate), tape, foam, paper and/or other insulative materials. In other embodiments, other non-electrically conductive synthetic and/or natural materials having suitable weight, strength, cost, manufacturing and/or other characteristics can be used for the electrical insulator 240.

The electrical insulator 240 may be attached to the first electrically conductive member 235 in any of several suitable ways. For example, the electrical insulator 240 can be sprayed on the first electrically conductive member 235 while in a liquid state, and can solidify to form a solid coating. As another example, the electrical insulator 240 may be attached to the first electrically conductive member 235 using an adhesive having suitable bonding characteristics.

Figure 3B:
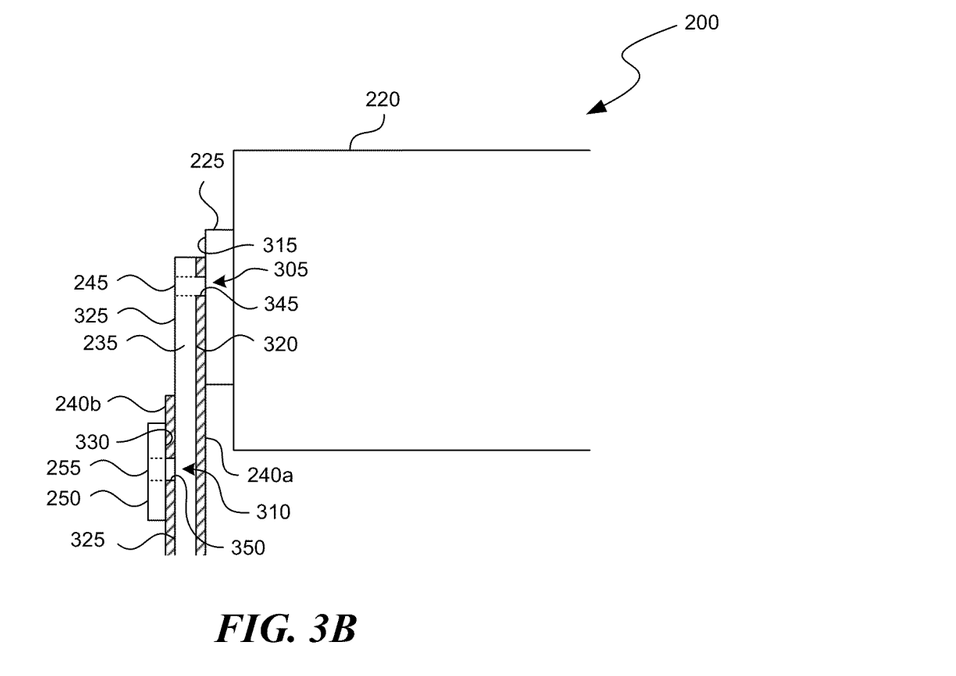
FIG. 3B is an enlarged cross-sectional side view taken along line 3B-3B of FIG. 3A.

FIG. 3B is an enlarged cross-sectional side view taken along line 3B-3B in FIG. 3A, illustrating various features of the battery package 200. As this view illustrates, positive terminal 225 includes a conductive surface 315. The first electrically conductive member 235 includes a first conductive surface 320 facing toward the conductive surface 315 and a second, conductive surface 325 facing away from the battery cell 220. A first portion 240a (shown with hatched lines) of the electrical insulator 240 is attached to the first conductive surface 320 of the first electrically conductive member 235, and a second portion 240b (also shown with hatched lines) of electrical insulator 240 is attached to the second conductive surface 325 of the first electrically conductive member 235.

The first conductive surface 320 of the first electrically conductive member 235 is electrically attached to the conductive surface 315 of the positive terminal 225 through two passages 305 (one of which is visible in FIG. 3B) in the first portion 240a of electrical insulator 240. The second electrically conductive member 250 has a conductive surface 330 that is attached to the second conductive surface 325 of the first electrically conductive member 235 through two passages 310 (one of which is visible in FIG. 3B) in the second portion 240b of electrical insulator 240. The passages 305, 310 can be formed as part of the process of forming the electrical attachments or connections.

The first conductive surface 320 of the first electrically conductive member 235 may be electrically attached to the conductive surface 315 of the positive terminal 225 using a variety of suitable techniques. For example, a welding process, such as a resistance welding process, may be used to attach the first conductive surface 320 to the conductive surface 315. The welding process, or more particularly, heat generated during, as a result of, or by welding, can remove part of the first portion 240a of the electrical insulator 240 (for example, by burning away, vaporizing, ablating and/or otherwise removing parts of the first portion 240a), thereby forming the passages 305. The passages 305 can have a sidewall or edge 345 with characteristics that indicate the removal of the portion of the first portion 240a of the electrical insulator 240. For example, the sidewall 345 may be irregular, jagged, melted, burned, at least partially discolored, etc. The welding process may then, without significant time intervening since the removal of the first portion 240a of the electrical insulator 240, attach the first conductive surface 320 to the conductive surface 315 of the battery cell 220 by welds 245. The conductive surface 330 of the second electrically conductive member 250 may be attached to the second conductive surface 325 of the first electrically conductive member 235 using a similar welding process. That is, a welding process may both remove portions of the first portion 240b of the electrical insulator 240, thereby forming the passages 310, and attach the conductive surface 330 to the conductive surface 325 by welds 255. The passages 310 have sidewalls 350 that also indicate the removal of the second portions of the electrical insulator 240b. In at least one embodiment, the second portion 240b of the electrical insulator 240 does not extend to the welds 245 between the first electrically conductive member 235 and the battery cell 220. This allows the contacts of an electric welding device (not shown) to have unimpeded electrical communication with the second conductive surface 325 as it forms the welds 245.

The passages 305, 310 may be referred to herein as vias, openings, voids apertures, and/or interstices and can be a particular example of an ablated region. In some embodiments, the outer perimeters of the passages 305, 310 are completely surrounded by the electrical insulator 240a, 240b. In some embodiments, the outer perimeters of the passages 305, 310 are less than completely surrounded by the electrical insulator 240a, 240b (for example, a passage 305, 310 may be at an extremity of the electrical insulator 240a, 240b, and therefore, a portion of the outer perimeter of the passage 305, 310 may not be closed off by the electrical insulator 240a, 240b). In other embodiments, the passages 305, 310 can have other configurations.

The first electrically conductive member 235 can be attached to the positive terminal 225 and to the second electrically conductive member 250 using welding techniques other than resistance welding. For example, welding techniques such as those generally placed in one or more of the following categories—arc welding, gas welding, energy beam welding (for example, laser beam welding, electron beam welding, etc.), and solid-state welding (for example, ultrasonic welding, friction welding, induction welding, etc.)—may be used. Non-welding techniques, such as soldering and brazing, as well as mechanical fasteners (for example, screws, bolts, rivets, etc.) may be used as an alternative to or in addition to welding techniques in particular embodiments. As another example, a chemical process may be used to both remove a portion of the electrical insulator 240a, 240b and to attach the first electrically conductive member 235 to the positive terminal 225 or to the second electrically conductive member 250. In general, any suitable method for attaching the electrically conductive member 235 to the positive terminal 225 and to the electrically conductive member 250 may be used, as long as electrical connections between the first electrically conductive member 235 and the positive terminal 225 and between the first electrically conductive member 235 and the second electrically conductive member 250 are created as part of a process that also removes the parts of the electrical insulator 240 that would otherwise interfere with such electrical connections.

Figure 3C:
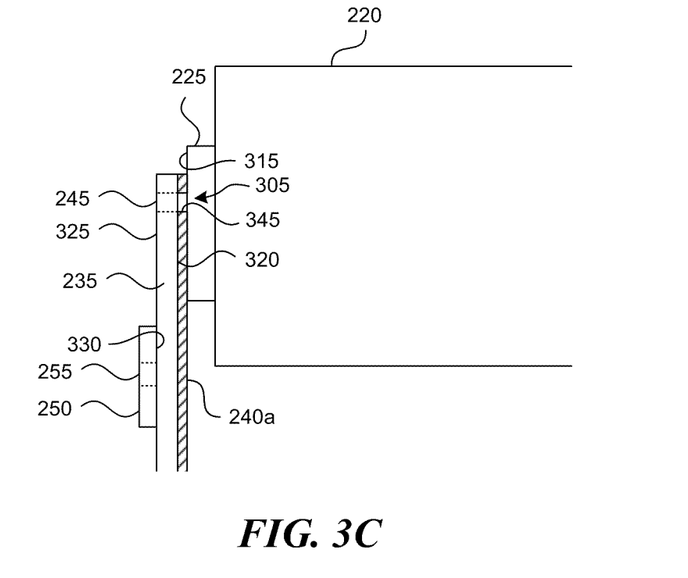
FIG. 3C is an enlarged cross-sectional side view of a battery cell and an electrically conductive member configured in accordance with another embodiment of the disclosure.

FIG. 3C is an enlarged cross-sectional side view of the battery cell 220 and the first electrically conductive member 235 configured in accordance with another embodiment of the disclosure. In the embodiment illustrated in FIG. 3C, the electrical insulator 240 (portion 240a) is attached to only the first conductive surface 320 of the first electrically conductive member 235. There is no insulation attached to the second conductive surface 325 of the first electrically conductive member 235. An advantage of this arrangement is that the first electrically conductive member 235 shown in FIG. 3C may be cheaper and/or easier to manufacture than the electrically conductive member 235 shown in FIG. 3B. Another advantage is that it avoids the potential for insulation on the second conductive surface 325 to interfere with the formation of the weld 245 with the battery cell 220. Conversely, an advantage of the electrically conductive member 235 shown in FIG. 3B is that the second conductive surface 325 may be less likely to cause inadvertent short circuits by virtue of the additional insulation.

Figure 3D:
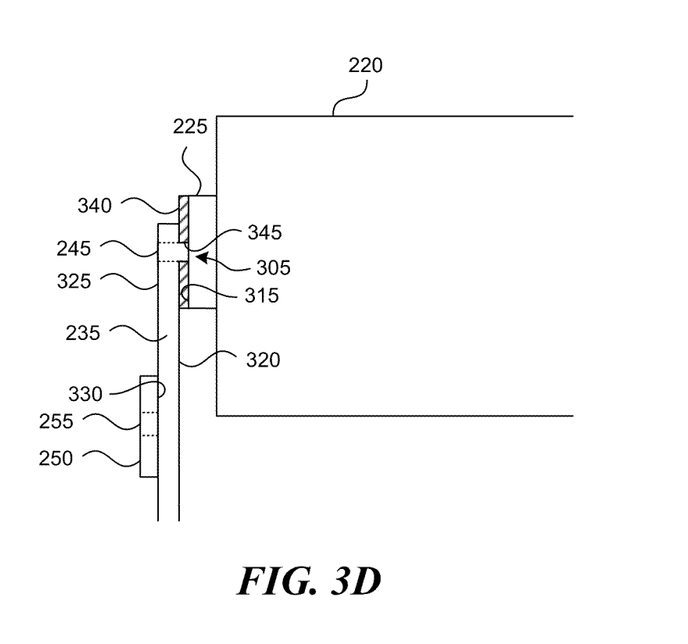
FIG. 3D is an enlarged cross-sectional side view of a battery cell and an electrically conductive member configured in accordance with another embodiment of the disclosure.

FIG. 3D is an enlarged cross-sectional side view of the battery cell 220 and the first electrically conductive member 235 configured in accordance with another embodiment of the disclosure. In the embodiment illustrated in FIG. 3D, an electrical insulator 340 is attached to the conductive surface 315 of the positive terminal 225 instead of to the conductive surface of the first electrically conductive member 235. In other embodiments, a removable (for example, ablatable) electrical insulator can be located at both the first conductive surface 320 of the first electrically conductive member 235, and at the conductive surface 315 of the positive terminal 225.

Referring generally to the embodiments shown in FIGS. 2-3D, prior to attaching the positive terminal 225 to the first electrically conductive member 235, the electrical insulator 240a, 340 prevents the positive terminal 225 from being electrically connected to the first electrically conductive member 235. The electrical insulator 240a, 340 thus prevents electrical current from passing from the positive terminal 225 to the first electrically conductive member 235 or from the electrically conductive member 235 to the positive terminal 225. Electrical current can pass only when the conductive surface 315 of the positive terminal 225 is properly attached to the first conductive surface 320 of the electrically conductive member 235. The configurations of the electrical insulator 240a, 340 described herein enable a missing or improper attachment to be detected, such as via electrical testing that detects the absence of current passing from the positive terminal 225 to the electrically conductive member 235, and/or through other testing (for example, visual inspection, detection of vapors and/or particles formed by ablating and/or otherwise removing the electrical insulator 240a, 340, and/or other testing). Accordingly, the electrical insulator 240a, 340 enables missing or improper attachments between the first electrically conductive members 235 and cells 220 to be detected, regardless of the configuration of the battery pack 100.

Prior to attaching the second electrically conductive member 250 to the first electrically conductive member 235, the electrical insulator 240b prevents the second electrically conductive member 250 from being electrically connected to the first electrically conductive member 235. Similarly, electrical current can only pass from and to the first electrically conductive member 235 to and from the electrically conductive member 250 when the two are properly attached. Accordingly, the electrical insulator 240b similarly enables missing or improper attachments between the electrically conductive members 235, 250 to be detected, regardless of the configuration of the battery pack 100. One advantage of the battery packs configured in accordance with embodiments described herein is that improper or missing attachments between electrical components can be detected and/or remediated before the battery packs are provided to an end user and/or are used with an electronic device. In particular embodiments, the battery packs can be manipulated and/or re-shaped after testing and (if necessary) remediation, without causing a previously undeleted poor connection to be exposed. Battery packs configured as described herein can also provide other benefits, such as preventing short circuits between various electrical components.

Figure 4:
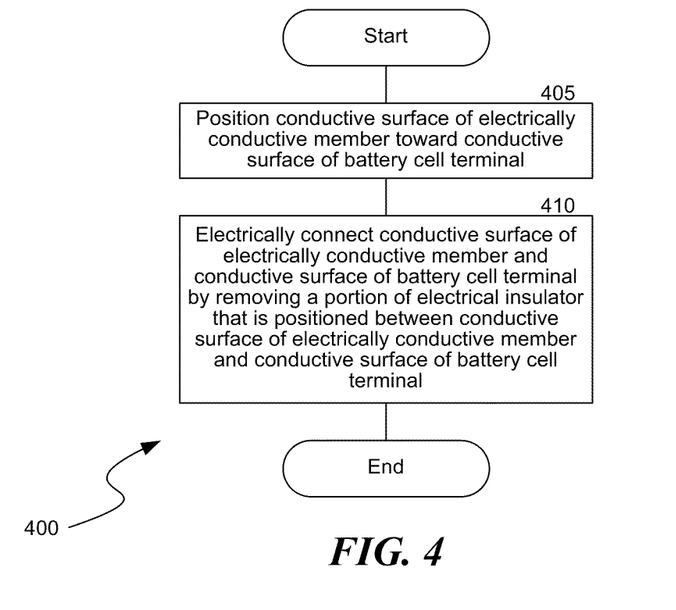
FIG. 4 is a flow diagram of a process for assembling a battery pack in accordance with an embodiment of the disclosure.

FIG. 4 is a flow diagram of a process 400 for assembling a battery pack in accordance with an embodiment of the disclosure. The process 400 begins at block 405, during which the conductive surface 320 of the first electrically conductive member 235 is positioned toward conductive surface 315 of battery cell terminal 225, 230. At block 410, the conductive surface 320 of the first electrically conductive member 235 is electrically connected to the conductive surface 315 of battery cell terminal 225, 230a by removing a portion of the electrical insulator 240a, 340 that is positioned between the conductive surface 320 of first electrically conductive member 235 and the conductive surface 315 of battery cell terminal 225, 230. As previously described, a welding process may be used both to remove the portion of the electrical insulator 240a, 340 (for example, by ablating the portion) and to physically attach the conductive surface 320 of the first electrically conductive member 235 to the conductive surface 315 of the battery cell terminal 225, 230 (for example, by melting a portion of the first electrically conductive member 235, the battery cell terminal 225, 230, or both, to physically and electrically join the two components). The removal of the portion of the electrical insulator 240a, 340 and the physical attachment of the conductive surface 320 of the first electrically conductive member 235 to the conductive surface 315 of the battery cell terminal 225, 230 can occur as part of a single, generally continuous process.

In some embodiments, block 410 includes two stages: a first stage in which the portion of the electrical insulator 240a, 340 is removed (for example, the portion of the electrical insulator 240a, 340 is ablated by heat generated by, during, or as a result of welding); and a second stage in which the conductive surface 320 of the first electrically conductive member 235 is electrically connected to the conductive surface 315 of battery cell terminal 225, 230a (for example, by material melted by heat generated by, during, or as a result of welding). As discussed above, in at least some embodiments, the same physical process (for example, heating) can be used to carry out both stages, and the first conductive member 235 and the battery cell 220 can remain in the same position as both stages are carried out, and both stages can be carried out sequentially, for example, without intervening steps and/or a significant intervening time period.

After step 410 the process 400 ends. A similar process may be utilized to attach the second electrically conductive member 250 to the first electrically conductive member 235.

Those skilled in the art will appreciate that the steps shown in FIG. 4 may be altered in a variety of ways. For example, the order of the steps may be rearranged; substeps may be performed in parallel; shown steps may be omitted, or other steps may be included. For example, in some embodiments, the electrical insulator 240a, 340 may be previously attached to the first electrically conductive member 235 or to the battery cell terminal 235, 230. Further, the electrical insulator 240a, 340 may include pre-made passages 305 through which the first electrically conductive member 235 may be electrically connected to the battery cell terminal 225, 230, which may at least partially obviate removing portions of the electrical insulator 240a, 340. As another example, in some embodiments, other suitable techniques may be used to remove the portion of the electrical insulator 240a, 340 and to physically join the conductive surface 320 of the first electrically conductive member 235 to the conductive surface 315 of battery cell terminal 225, 230, as long as an electrical connection between the two components is created. As another example, in some embodiments, all or generally all of the electrical insulator 240, 340 may be removed from between the electrical components between which an electrical connection is created, and therefore, there is little or no electrical insulator 240, 340 left between the electrical components (and therefore, no passages 305, 310).

From the foregoing, it will be appreciated that specific, representative embodiments have been described herein for purposes of illustration, but that various modifications may be made to these embodiments. For example, the electrical insulator 240 may not cover or be attached to certain surfaces of the electrically conductive member 235, 250. The battery packages can also have features other than those described above and shown in the Figures and may also include more or fewer components than those illustrated. For example, in some embodiments the package casing 210 and/or the electrical component 215 may be omitted. In some embodiments a different number of battery cells may be housed in variously sized packages, and in other embodiments the battery cells may comprise non-rechargeable chemistries. In some embodiments, the battery cells may be at least partially covered with shrink wrap or other material to join the battery cells together. In some embodiments, in addition to or as an alternative to battery cells 220, the battery package 200 may include other types of energy storage devices, such as fuel cells, capacitors (for example, supercapacitors), or hybrid arrangements of one or more of these energy storage devices. In some embodiments, the battery pack includes a single energy storage device and an electrically conductive member configured to be attached (or already attached) to an electrical component. The battery package can be coupled to any of a wide variety of portable and stationary electronic devices. Further, while advantages associated with certain embodiments have been described in the context of those embodiments, other embodiments may also exhibit such advantages, and not all embodiments need necessarily exhibit such advantages to fall within the scope of the present technology.

We claim:
1. A battery pack, comprising:
a) a battery cell having a first electrically conductive member serving as a cell terminal;
b) a second electrically conductive member providing a second electrically conductive surface facing the first electrically conductive member, wherein the first and second electrically conductive members are electrically and physically connected to each other; and
c) an electrically insulating material positioned intermediate the first electrically conductive member providing the cell terminal and the entire second electrically conductive surface other than where the first and second electrically conductive members are electrically and physically connected to each other.

2. The battery pack of claim 1 wherein the electrically insulating material is attached to the second electrically conductive surface facing the cell terminal.

3. The battery pack of claim 1. wherein the electrically insulating material is coated on the second electrically conductive surface facing the cell terminal.

4. The battery pack of claim 1 wherein the electrically insulating material is attached to the first electrically conductive member other than where the cell terminal is attached to the second electrically conductive member.

5. The battery pack of claim 1 wherein the second electrically conductive member comprises a conductive strip having oppositely facing first and second strip surfaces, and wherein the second strip surface is electrically connected to the cell terminal, and the first, oppositely facing strip surface is uninsulated.

6. The battery pack of claim 1 wherein the first electrically conductive member serving as the cell terminal is welded to the second electrically conductive member.

7. The battery pack of claim 1 wherein the first electrically conductive member serving as the cell terminal is electrically welded to the second electrically conductive member.

8. The battery pack of claim 1 wherein the electrically insulating material includes a polymeric material.

9. A battery pack, comprising:
at least two battery cells, each battery cell having a first electrically conductive member serving as a cell terminal;
b) a strip-shaped electrically conductive member having two oppositely facing strip surfaces, wherein a first one of the strip surfaces is uninsulated and an opposite, second strip surface faces and is physically attached to the respective first electrically conductive members serving as cell terminals of the at least two battery cells; and
c) an electrically insulating material carried by the entire second strip surface of the strip-shaped electrically conductive member,
d) wherein the electrically insulating material has individual passages surrounded by electrically insulating material, the passages facing toward the corresponding first electrically conductive members of the at least two battery cells, wherein the strip-shaped electrically conductive member is welded to the corresponding first electrically conductive members at welds that extend through the passages.

10. The battery pack of claim 9 wherein the strip-shaped electrically conductive member is a first electrically conductive member and wherein a second strip-shaped electrically conductive member is electrically welded to the first strip surface opposite the second strip surface of the first strip-shaped electrically conductive member.

11. A battery pack, comprising:
a) a battery cell having a first electrically conductive member serving as a cell terminal;
b) a second electrically conductive member providing a second electrically conductive surface facing the first electrically conductive member, wherein the first and second electrically conductive members are electrically and physically connected to each other along an axis intersecting perpendicularly with the first electrically conductive member spaced from the second conductive member; and
c) an electrically insulating material positioned intermediate the first electrically conductive member and the entire second electrically conductive surface other than along the axis where the first and second electrically conductive members are electrically and physically connected to each other.

12. The battery pack of claim 11 wherein the electrically insulating material is attached to the second electrically conductive surface facing the cell terminal.

13. The battery pack of claim 11 wherein the electrically insulating material is attached to the first electrically conductive member serving as the cell terminal.

14. The battery pack of claim 11 wherein the second electrically conductive member comprises a strip having oppositely facing first and second strip surfaces, and wherein the second strip surface is electrically connected to the cell terminal, and the first, oppositely facing strip surface as uninsulated.

15. The battery pack of claim 11 wherein the first electrically conductive member is welded to the second electrically conductive member.

16. The battery pack of claim 11 wherein the electrically insulating material includes a polymeric material.

17. A battery pack, comprising:
a) a battery cell having a first electrically conductive member serving as a cell terminal;
a second electrically conductive member having a second electrically conductive surface facing the first electrically conductive member, wherein the first and second electrically conductive members are electrically and physically connected to each other, and wherein no portion of the first electrically conductive member is vertically above the second electrically conductive surface; and
c) an electrically insulating material positioned intermediate the first electrically conductive member providing the cell terminal and the entire second electrically conductive surface other than where the first and second electrically conductive members are electrically and physically connected to each other.

18. The battery pack of claim 17 wherein the electrically insulating material is attached to the second electrically conductive surface facing the cell terminal.

19. The battery pack of claim 17 wherein the electrically insulating material is attached to the first electrically conductive member serving as the cell terminal.

20. The battery pack of claim 17 wherein the first electrically conductive member is welded to the second electrically conductive surface.

* * * * *

UNITED STATES PATENT AND TRADEMARK OFFICE
CERTIFICATE OF CORRECTION

PATENT NO. : 8,808,892 B2  
APPLICATION NO. : 12/903878  
DATED : August 19, 2014  
INVENTOR(S) : Thomas P. Maxwell and Eric Petterson Page 1 of 1

It is certified that error appears in the above-identified patent and that said Letters Patent is hereby corrected as shown below:

Title Page, item (75), Inventors, line 2 delete "Beavewrton" and insert --Beaverton--

In the Claims,

Column 8, line 47 (Claim 3, line 1) delete the "." after the words "claim 1"

Signed and Sealed this  
Twenty-fourth Day of February, 2015

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,808,892 B2 | Page 1 of 1 |
| APPLICATION NO. | : 12/903878 | |
| DATED | : August 19, 2014 | |
| INVENTOR(S) | : Maxwell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this
Twenty-fourth Day of November, 2015

Michelle K. Lee
*Director of the United States Patent and Trademark Office*